E. C. BACON.
Lightning-Rod Coupling.

No. 214,545.  Patented April 22, 1879.

Witnesses.  Inventor.

UNITED STATES PATENT OFFICE.

ELMORE C. BACON, OF CLEVELAND, OHIO.

IMPROVEMENT IN LIGHTNING-ROD COUPLINGS.

Specification forming part of Letters Patent No. 214,545, dated April 22, 1879; application filed January 27, 1879.

*To all whom it may concern:*

Be it known that I, ELMORE C. BACON, of Cleveland, in the county of Cuyahoga and State of Ohio, have invented a certain new and Improved Lightning-Rod; and I do hereby declare that the following is a full, clear, and complete description thereof, reference being had to the accompanying drawings, making a part of the same.

The nature of my improvement in lightning-rods relates to the means employed for coupling and securing the sections of rods together.

The improvement is applied to that class known as "tubular rods;" and consists in making one end of a section into a tenon, tapering from its shouldered junction with the main body of the rod along a portion of said tenon, and parallel with the remainder, and forming an integral part of the section. The other or connecting section of the rod is shaped to receive the said tenon, and when thus connected together a pin or rivet is passed through the exterior section and the tenon to secure the connection together.

Figure 1:
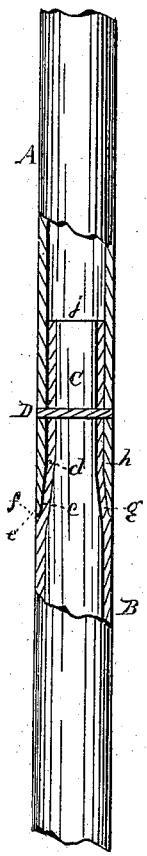
Figure 2:
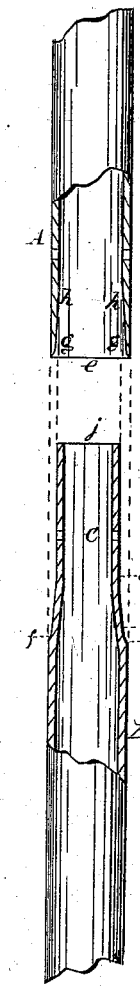

Figure 1 is a view of the rod and joint in section. Fig. 2 is a view of the joint and sections detached.

Like letters of reference refer to like parts in the several views.

I am aware that tubular lightning-rods have been connected together by means of a dowel or pin inserted in both ends of the tube, and that tubular sections have been coupled by means of a sleeve or thimble screwed or otherwise secured to the exterior or interior ends of the tubes. Therefore I do not claim such devices; but what distinguishes my improvement is the tenon made parallel along a certain portion of its length, and the remainder tapering with the swell of the taper, terminating in a curved shoulder at its junction with the body of the rod, all in one piece of metal, in combination with the female section, shaped to fit the said tenon and shoulder, making a strong and secure coupling, and at the same time a continuous and even external surface.

The tapering form of the tenon prevents the joint from becoming loose and shackling, as in the ordinary mode of coupling.

The weak part of a tubular lightning-rod is usually at the jointed connection of the sections; but by tapering the tenon and making a curved shoulder between the swell of the taper and body of the rod, a firm and durable coupling is the result when connected with the adjoining section, as shown.

The form of the tenon and shoulder presents no sharp angles, which tend to crack and rupture the metal. Hence the metal is not liable to break when subjected to the strain of its erection and use.

In Fig. 1, A and B represent two sections of a tubular rod. From section B extends a tenon, C, forming one end thereof. The tenon from $d$ to $c$ is tapering, the base terminating in a curved shoulder, $f$.

Section A is also tapering from $g$ to $h$ in the interior of the tube, as seen in Fig. 2, which taper corresponds with the taper on the tenon. The end $e$ of section A is shaped to fit the shoulder $f$, as seen in the drawings.

That part of the tenon from $d$ to $j$ extending beyond the taper may be parallel when the two sections are shaped and coupled together as described.

A pin or rivet, D, is passed through the connected ends of the sections and riveted.

What I claim as my invention, and desire to secure by Letters Patent, is—

1. In joints for tubular lightning-rods, the tenon formed parallel along a portion of its length, and tapering the other part thereof, with a shoulder in junction with the swell of the taper and body of the section, all in one piece, substantially as and for the purpose specified.

2. In tubular lightning-rods, an improvement consisting in one end of section B, formed with a tenon tapering along a portion of its length, and parallel with the other, with a shoulder at the junction of said body of the rod, all in one piece of metal, in combination with the section A, shaped to fit said tenon, and with one or more rivets to form a coupling-joint, substantially in the manner as described.

ELMORE C. BACON.

Witnesses:
W. H. BURRIDGE,
J. H. BURRIDGE.